Feb. 21, 1950     R. E. REINNAGEL     2,498,578
EDUCATIONAL DEVICE
Filed Nov. 20, 1946
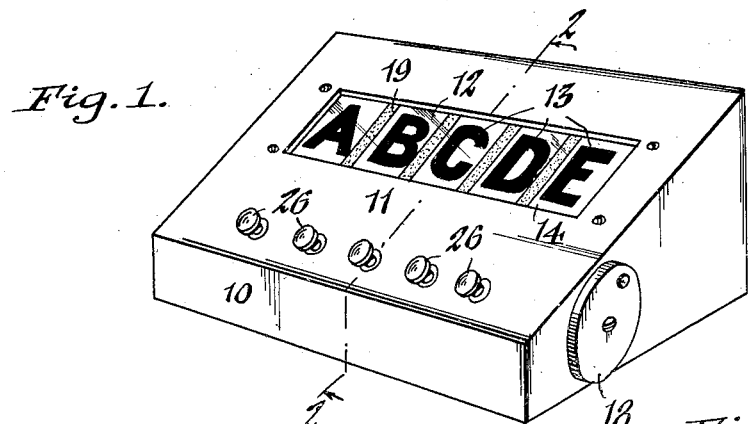
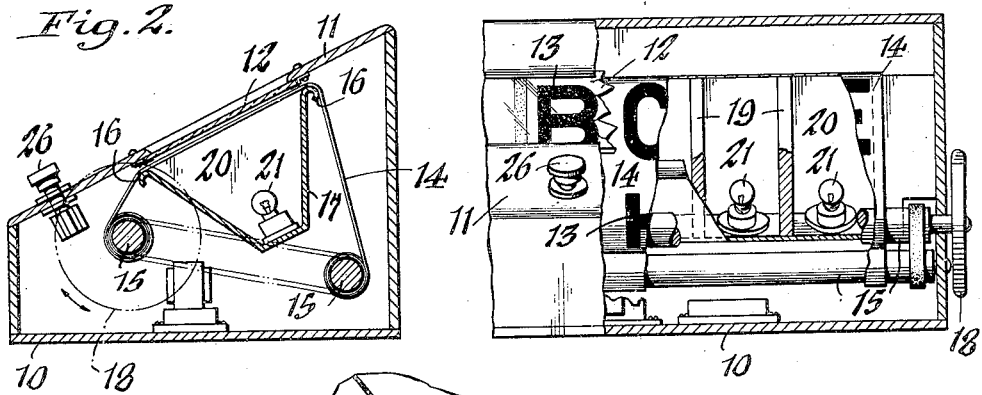
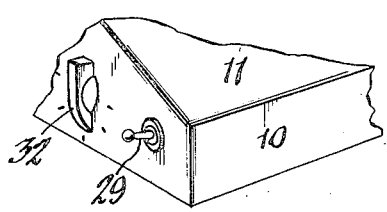
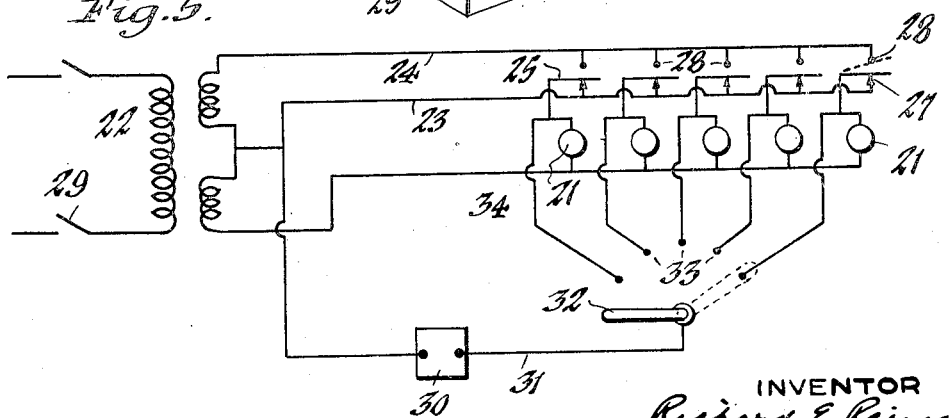
INVENTOR
Richard E. Reinnagel,
BY Walker P. Geyer
ATTORNEY Patented Feb. 21, 1950

2,498,578

UNITED STATES PATENT OFFICE 2,498,578

EDUCATIONAL DEVICE

Richard E. Reinnagel, Eggertsville, N. Y.

Application November 20, 1946, Serial No. 710,992

4 Claims. (Cl. 35—35)

This invention relates generally to certain new and useful improvements in educational devices for use by children, but more particularly to a device which also serves as a toy or for amusement purposes.

It has for one of its objects to provide a device of this character which is designed to alert the child's interest in certain objects, characters, letters, numbers, etc., and at the same time stimulate the aural and sight senses of the child.

Another object of the invention is to provide a combined amusement and educational device which is so designed and constructed as to hold the child's attention and interest in teaching him the letters of the alphabet or the names of certain objects etc., and stimulate that interest by both illuminating and sound appurtenances selectively controlled by the parent or by the child.

A further object is the provision of a child's educational appliance which is simple and compact in construction, which is reliable in operation, and which is electrically governed and easy to manipulate.

Other features of the invention reside in the construction and arrangements of parts hereinafter described and particularly pointed out in the appended claims.

In the accompanying drawings:

Figure 1 is a perspective view of the educational device embodying my invention. Figure 2 is a cross section thereof taken in the plane of line 2—2, Figure 1. Figure 3 is a fragmentary, sectional front view of the device. Figure 4 is a fragmentary perspective view of the opposite or left hand end of the device viewed in Figure 1 and showing the on and off and selective switch controls. Figure 5 is a diagrammatic view of the electric circuit of the device.

Similar characters of reference indicate the corresponding parts throughout the several views.

Referring now to the drawings showing the preferred embodiment of my invention, 10 indicates a casing or cabinet of suitable design and construction for housing the working parts of the device and including a sloping top wall 11 containing a window 12 through which is readily and conveniently visible the instructional characters 13 borne by the device. These characters may consist of numbers, letters, pictures, etc., and are printed or otherwise reproduced in rows or columns on a traveling endless band or apron 14 movably mounted within the casing and passing at its lower side about rollers 15 extending from end to end thereof. Its upper side passes beneath the window 12, as shown in Figures 1 and 2, being guided on the front and rear upper curved edges 16 of a lamp housing 17 opening upwardly into the area defined by the window. Motion is transmitted to this band to selectively expose one or another of its rows of characters through the window by a hand wheel 18 connected to one of the rollers 15.

The lamp housing 17 is divided by transverse partitions 19 into a plurality of individual lamp compartments 20 which register with the companion columns of characters on the band 14 to selectively illuminate one or another of the characters in a given row, as will hereinafter appear. In each compartment is an electric lamp 21 included in a transformer circuit 22 having a 3-volt line 23 and a 6-volt line 24. The 3-volt line is normally closed across companion switches 25, one for each lamp, to individually control them by corresponding push buttons 26 mounted on the front portion of the sloping top wall of the casing 10 and in registering alinement with the companion lamp compartments 20, as shown in Figure 1. Normally these control switches are closed at the switch terminals 27, as shown by full lines in Figure 5, and upon depressing one or another of the push buttons its switch is opened at the companion 3-volt terminal 27 and closed across the companion 6-volt terminal 28, as shown by dotted lines at the right of such figure. Thus, when the device is in operation and the on and off switch 29 is closed, the lamps give a soft or glowing light and when a given push button 26 is depressed, the companion lamp circuit is closed across the 6-volt line to give a brighter light which makes the companion character in register with that lamp-compartment stand out clearly and distinctly to the child.

For the purpose of further stimulating the child's attention and interest to a given letter or other character which the parent may be teaching the child through the medium of this device, I provide, in addition to the sight feature, a selectively-controlled aural or sound element consisting of a bell, buzzer or like sound-creating device 30. This audible element is included in the transformer circuit and has one terminal connected to the line 23 and its other terminal connected by a wire 31 to the adjustable arm 32 of a selective switch including multiple contacts 33. These contacts correspond in number to the lamps 21 and are connected to one terminal thereof, the other terminal of the lamps being connected to the return line 34 of the transformer circuit.

Thus, when a given lamp 21 is brightly lighted by depressing the companion push button 26 to close its switch 25 across the 6-volt terminal 28 and it is desired to render the sound element 30 operative to further alert the child's attention to the character being displayed, the selective switch control arm 32 is turned to the companion contact 33 connected to that lamp, thereby resulting in the closing of the circuit of the sound element. Or if desired, the selective control arm may be set at a given position, say that contact including the lamp associated with the letter "E", and the child then asked to point out that letter by depressing the companion push button 26, whereupon that lamp will be flashed on brighter and the sound element 30 will be simultaneously operated and indicate to the child that he has answered correctly.

While manifestly simple and compact in construction, this device is both amusing and educational to adults as well as children, and by attracting attention to both the eye and ear senses it develops and teaches the child alertness while familiarizing him with the letters of the alphabet and other objects in an interesting manner.

I claim as my invention:

1. An educational device, comprising a cabinet having a window therein, means in said cabinet for displaying groups of different characters through said window, individual lamp means for illuminating the characters of a group individually, a high and low voltage electric circuit including said lamps and separate switches for controlling them, an audible element in the high voltage line of said circuit, and a selective switch in the circuit of the audible element and the lamps for rendering the former operative whenever a companion lamp-switch is closed across the high voltage line.

2. An educational device, comprising a cabinet having a window therein, an apron movably mounted in said cabinet and having rows of characters applied thereon for display a row at a time through said window, a lamp compartment in said cabinet including lamps for individually lighting the respective characters in a displayed row, an audible element in said cabinet, an electric circuit including said lamps and said audible element, individual lamp control switches in said circuit, and a selective switch in said circuit having terminals corresponding in number to said lamp switches and connected to companion terminals thereof for rendering the audible element operative when one or another of the lamp control switches is closed.

3. An educational device, comprising a cabinet having a window therein, an apron movably mounted in said cabinet and having rows of characters applied thereon for display a row at a time through said window, a lamp compartment in said cabinet including lamps for individually lighting the respective characters in a displayed row, an audible element in said cabinet, an electric circuit including said lamps and said audible element, said circuit having low and high volt lines, individual lamp control switches in said circuit to close it across either the low or high volt line, said switches being normally closed across the low volt line, and a selective switch in said circuit having terminals corresponding in number to said lamp switches and connected to companion terminals thereof for rendering the audible element operative when one or another of the lamp control switches is in a circuit-closed position across the high volt line.

4. An educational device, comprising a cabinet having a window therein, an apron movably mounted in said cabinet and having rows of characters applied thereon for display a row at a time through said window, a lamp compartment in said cabinet including lamps for individually lighting the respective characters in a displayed row, an audible element in said cabinet, an electric circuit including said lamps and said audible element, said circuit having low and high volt lines, individual lamp control switches in said circuit to close it across either the low or high volt line, said switches being normally closed across the low volt line, push buttons companion to said switches for selectively closing them across the high volt line, and a selective switch in said circuit for rendering the audible element operative only when one or another of the lamp control switches is in a circuit-closed position across the high volt line, said selective switch including a movable arm and a plurality of contacts corresponding in number to and circuit-connected to said lamps.

RICHARD E. REINNAGEL.

REFERENCES CITED

The following references are of record in the file of this patent:

UNITED STATES PATENTS

| Number | Name | Date |
|---|---|---|
| 1,810,529 | Rice | June 16, 1931 |
| 1,949,783 | Cleaver | Mar. 6, 1934 |
| 2,050,805 | Pumar | Aug. 11, 1936 |